United States Patent
Burt et al.

(10) Patent No.: US 8,190,302 B2
(45) Date of Patent: May 29, 2012

(54) LOAD SHEDDING SYSTEM FOR AN ELECTROMECHANICALLY CONTROLLED OVEN

(75) Inventors: Ashley Wayne Burt, Louisville, KY (US); Brian M. Steurer, Louisville, KY (US); Mark Davis Johnson, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/887,911

(22) Filed: Sep. 22, 2010

(65) Prior Publication Data
US 2011/0071696 A1 Mar. 24, 2011

Related U.S. Application Data

(63) Continuation-in-part of application No. 12/559,597, filed on Sep. 15, 2009.

(60) Provisional application No. 61/097,082, filed on Sep. 15, 2008.

(51) Int. Cl.
*G06F 1/28* (2006.01)
(52) U.S. Cl. ......... 700/295; 705/412; 219/412; 219/414
(58) Field of Classification Search .................. 700/12, 700/16, 19, 275, 295, 296; 219/391, 393, 219/412, 414, 483, 490, 506
See application file for complete search history.

(56) References Cited

U.S. PATENT DOCUMENTS

| | | | | |
|---|---|---|---|---|
| 5,040,724 A * | 8/1991 | Brinkruff et al. | ............. | 219/501 |
| 6,943,321 B2 * | 9/2005 | Carbone et al. | ................ | 219/412 |
| 7,110,832 B2 * | 9/2006 | Ghent | ........................... | 700/296 |
| 7,206,670 B2 * | 4/2007 | Pimputkar et al. | ............ | 700/291 |
| 7,561,977 B2 * | 7/2009 | Horst et al. | .................... | 700/295 |
| 2007/0213880 A1 * | 9/2007 | Ehlers | ........................... | 700/295 |
| 2009/0063257 A1 * | 3/2009 | Zak et al. | ...................... | 700/295 |
| 2009/0326728 A1 * | 12/2009 | Chrisop et al. | ................. | 700/295 |
| 2010/0017242 A1 * | 1/2010 | Hamilton et al. | ................. | 705/8 |
| 2011/0062142 A1 * | 3/2011 | Steurer | ......................... | 219/483 |
| 2011/0095017 A1 * | 4/2011 | Steurer | ......................... | 219/493 |
| 2011/0114627 A1 * | 5/2011 | Burt | ............................. | 219/506 |

* cited by examiner

*Primary Examiner* — Charles Kasenge
(74) *Attorney, Agent, or Firm* — Fay Sharpe LLP (57) ABSTRACT

A system for reducing peak power usage in a cooking appliance having an oven cavity therein is provided. The system includes at least one power consuming unit with at least two separately controllable elements, a user adjustable electromechanical switching device for controlling energization of the at least one power consuming unit, a control configured to receive and process a utility state signal indicative of the current state of an associated utility; and an element switching device responsive to the control and configured to selectively enable and disable energization of one of the elements in response to the utility state signal.

19 Claims, 9 Drawing Sheets

SYSTEM DIAGRAM

| RANGE CONTROL RESPONSE | | | |
|---|---|---|---|
| | | LOW | |
| RANGE CONTROL RESPONSE | PRIOR TO OPERATION | FACTORY SETTINGS MODE | |
| | DURING OPERATION | FACTORY SETTINGS MODE | |
| | | IF IN SELF-CLEAN, FINISH THE CYCLE | |
| | | MAX COOKING SETTING=HI | |
| RANGE UI RESPONSE (DSM DISABLED) | PRIOR TO OPERATION | DISPLAY NOTHING | |
| | | DISPLAY NOTHING | |
| RANGE UI RESPONSE (DSM ENABLED) | DURING OPERATION | DISPLAY NOTHING | |
| | | DISPLAY NOTHING | |

MATCH TO FIG. 5B

| | MEDIUM | HIGH | CRITICAL |
|---|---|---|---|
| | FACTORY SETTINGS MODE | FACTORY SETTINGS MODE | FACTORY SETTINGS MODE |
| MATCH TO FIG. 5A | FACTORY SETTINGS MODE | IF IN BAKE, BROIL OR PREHEAT CYCLE DURING THIS RATE, GO TO POWER SHARING MODE<br><br>PROHIBIT THE START OF SELF-CLEAN<br><br>PROHIBIT THE START OF ANY COOKING FUNCTION IN THE LOWER OVEN | IF IN BAKE, BROIL OR PREHEAT CYCLE DURING THIS RATE, GO TO POWER SHARING MODE<br><br>PROHIBIT THE START OF SELF-CLEAN<br><br>PROHIBIT THE START OF ANY COOKING FUNCTION IN THE LOWER OVEN |
| | IF IN SELF-CLEAN, FINISH THE CYCLE | IF IN SELF-CLEAN, FINISH THE CYCLE | IF IN SELF-CLEAN, FINISH THE CYCLE |
| | MAX COOKING SETTING=HI | MAX COOKING SETTING=8<br><br>ONLY RIGHT FRONT BURNER ALLOWED TO BE TURNED ON | MAX COOKING SETTING=8<br><br>ONLY RIGHT FRONT BURNER ALLOWED TO BE TURNED ON |
| | DISPLAY NOTHING | DISPLAY NOTHING | DISPLAY NOTHING |
| | DISPLAY NOTHING | DISPLAY NOTHING | DISPLAY NOTHING |
| | DISPLAY NOTHING | DISPLAY NOTHING | DISPLAY NOTHING |
| | DISPLAY NOTHING | DISPLAY "ECO" LED<br><br>FLASH "ECO" IN OVEN TEMPERATURE DIGITS AND GIVE ERROR BEEP IF UNALLOWED MODE IS ATTEMPTED | DISPLAY "ECO" LED<br><br>FLASH "ECO" IN OVEN TEMPERATURE DIGITS AND GIVE ERROR BEEP IF UNALLOWED MODE IS ATTEMPTED |

Fig. 8

LOAD SHEDDING SYSTEM FOR AN ELECTROMECHANICALLY CONTROLLED OVEN

CROSS REFERENCE TO RELATED APPLICATIONS

The present application is a continuation-in-part of U.S. application Ser. No. 12/559,597, filed Sep. 15, 2009, which claims priority from U.S. Provisional Patent Application Ser. No. 61/097,082 filed 15 Sep. 2008; both of which are expressly incorporated herein by reference, in their entireties.

BACKGROUND OF THE DISCLOSURE

This disclosure relates to energy management, and more particularly to energy management of household consumer appliances. The disclosure finds particular application to cooking appliances and is particularly advantageously applied to such appliances with electromechanically controlled oven heating elements.

Currently utilities charge a flat rate, but with increasing cost of fuel prices and high energy usage at certain parts of the day, utilities have to buy more energy to supply customers during peak demand. Utility companies have to find ways to temporarily provide for this higher energy use, which comes at great expense to utility companies. Consequently, utilities are charging higher rates during peak demand. If the utility company can communicate that power is in high demand, home appliances, such as ranges that are typically used during peak time (later afternoon), could notify the consumer that demand is high and reduce peak power usage of the appliance and allow the utility company to shed load. This "demand response" capability in cooking appliances spread over thousands of customers would allow the utility company to shed a significant amount of peak load.

One proposed third party solution is to provide a system where a control module "switches" the actual energy supply to the appliance or control unit on and off. However, there is no active control beyond the mere on/off switching.

While electronic controls can change or limit duty cycles in response to a "high demand", many ranges use electromechanical power switching devices that are not electronic. In such ranges the electromechanical control of the oven heaters is provided by thermostatic switching devices. This system aims to provide a way to reduce peak and average power consumption of such electromechanically controlled oven heaters with minimal changes to conventional electromechanically controlled cooking appliance design, in a cost effective manner. By implementing simpler control systems, this system is able to react to either a discrete normal demand or higher demand signal. Therefore, this system is a simple, low cost method to shed both peak and average power that does not require expensive fully electronic range control systems.

One method for providing low-cost reduction of peak and average power is to implement a simple demand side management "DSM" control device in an existing electromechanical appliance that will delay, adjust, or disable power consuming elements to reduce maximum power consumption. However, such a DSM add-on device will generally cut off the power to an entire heater. Therefore, there exists a need for reducing peak power consumption without eliminating an entire heater.

SUMMARY OF THE DISCLOSURE

According to one aspect of the present disclosure, a system for reducing peak power usage in an electromechanically controlled cooking appliance having an oven cavity therein is provided. The system includes at least one power consuming unit comprising at least two separately controllable elements, a user adjustable electromechanical switching device for controlling energization of the at least one power consuming unit, a control configured to receive and process a utility state signal indicative of the current state of an associated utility; and an element switching device responsive to the control and configured to selectively enable and disable energization of one of the elements in response to the utility state signal.

According to another aspect of the present disclosure, an electromechanically controlled cooking appliance is provided that includes an oven cavity with an oven heater disposed therein. The oven heater comprises at least a first and a second separately controllable heating element. The cooking appliance further includes an electromechanical switching device capable of controlling energization to the oven heater, an electronic control device configured to receive utility state signals from one of a DSM and a utility meter, and an electromechanical relay switch electronically coupled to the control. Upon receiving a signal indicating a peak demand period, the control operates the appliance in energy saving mode, and upon receiving a signal indicating an off-peak demand period, the control operates the appliance in normal mode.

According to yet another aspect of the present disclosure, a method for reducing peak power usage in an electromechanically controlled cooking appliance having an oven cavity therein is provided. The method includes providing the oven cavity with an oven heater comprising at least two separately controllable elements, electrically coupling an electronic control to an electromechanical relay switch, the electronic control configured to receive and process a utility state signal indicative of the current state of an associated utility, and selectively disabling one of the two elements in response to a signal indicative of a peak demand period.

Still other features and benefits of the present disclosure will become apparent from reading and understanding the following detailed description.

BRIEF DESCRIPTION OF THE DRAWINGS

FIGS. 5(*a*) and 5(*b*) illustrate an exemplary programmed control response for the cooking appliance of FIG. 2.

DETAILED DESCRIPTION OF THE PREFERRED EMBODIMENTS

Figure 1:
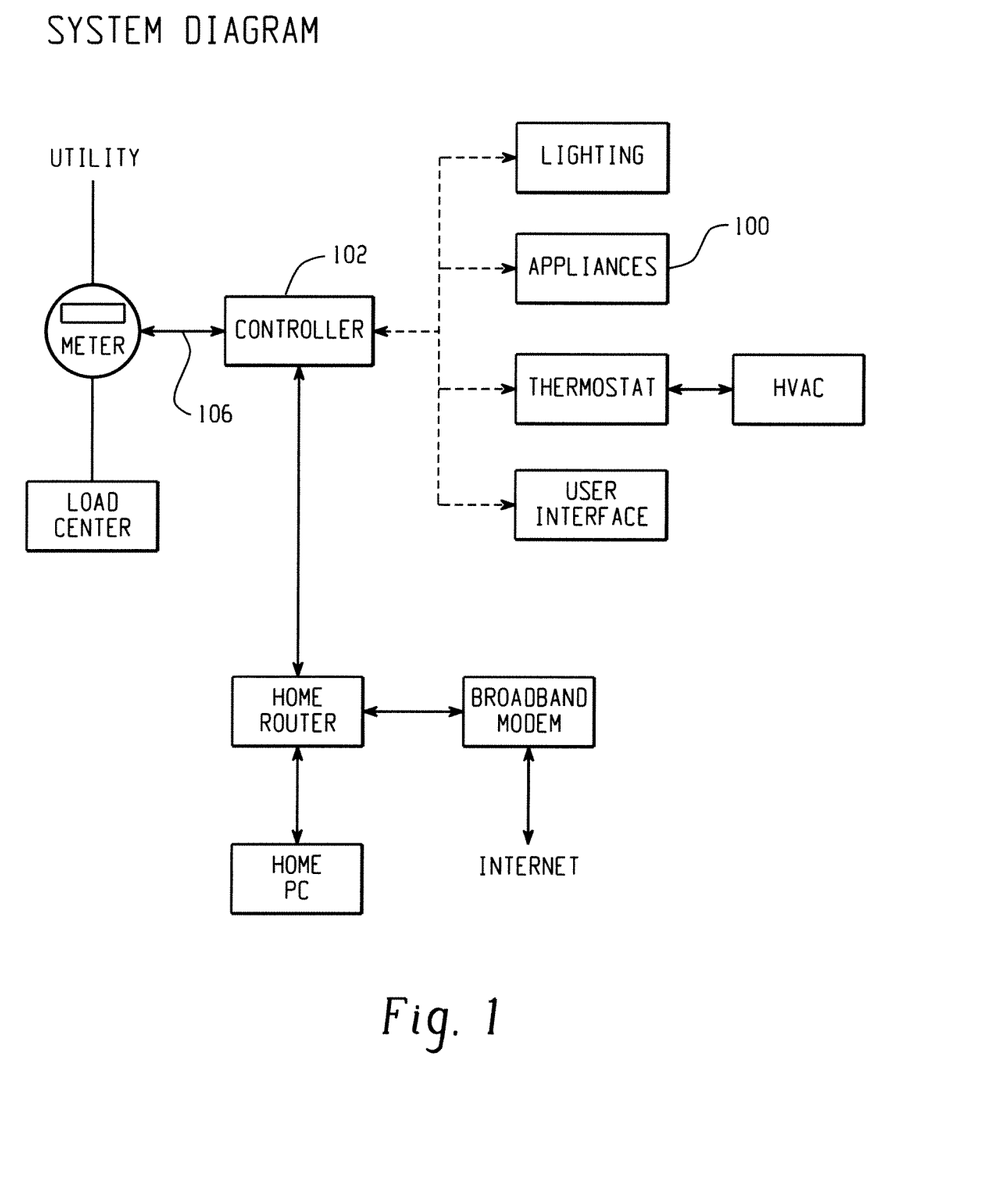
FIG. 1 illustrates an exemplary embodiment of an energy management system for household appliances.
Figure 2:
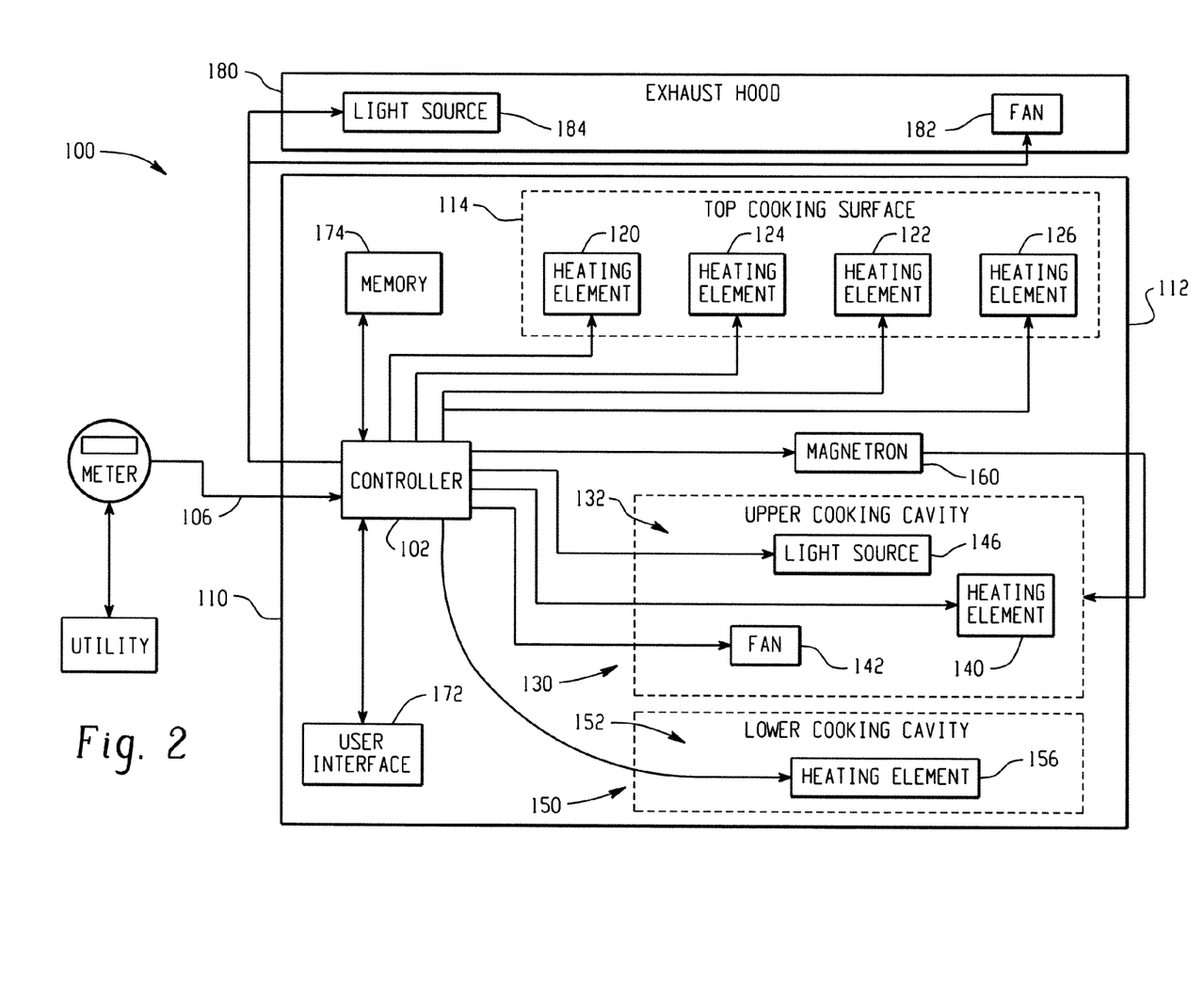
FIG. 2 is a schematic illustration of an exemplary demand managed electronically controlled cooking appliance.

An exemplary embodiment of an energy management system for household appliances is illustrated in FIG. 1. An electronic controller 102 is provided for communicating with a utility meter and reducing power consumption in response to a peak demand period. A demand managed electronically controlled cooking appliance is schematically illustrated in FIG. 2. The cooking appliance 100 comprises one or more power consuming features/functions and a controller 102 operatively connected to each of the power consuming features/functions. The controller 102 can include a micro computer on a printed circuit board which is programmed to selectively control the energization of the power consuming features/functions. The controller 102 is configured to receive and process a signal 106 indicative of a utility state, for example, availability, peak or off peak and/or current cost of supplied energy. Signal 106 may be received from the DSM, or from the smart utility meter. The energy signal may be provided to the smart meter by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 102 can operate the cooking appliance 100 in one of a plurality of operating modes, including a normal operating mode and an energy savings mode, in response to the received signal. Specifically, the cooking appliance 100 can be operated in the normal mode in response to a signal indicating an off-peak demand state or period and can be operated in an energy savings mode in response to a signal indicating a peak demand state or period. As will be discussed in greater detail below, the controller 102 is configured to at least one of selectively delay, adjust and disable at least one of the one or more power consuming features/functions to reduce power consumption of the cooking appliance 100 in the energy savings mode.

As shown in FIG. 2, the cooking appliance 100 is in the form of a free standing range 110 having a top cooking surface 114. Although, it should be appreciated that the cooking appliance 100 can be any suitable cooking appliance including, without limitation, counter top cooking appliances, built-in cooking appliances and multiple fuel cooking appliances. Therefore, the range 110 is provided by way of illustration rather than limitation, and accordingly there is no intention to limit application of the present disclosure to any particular cooking appliance.

The depicted exemplary range 110 includes an outer body or cabinet 112 with the top cooking surface 114 having at least one individual surface heating element. In the depicted embodiment, the top cooking surface 114 includes four individual surface heating elements, namely, a left front heating element 120, a right front heating element 122, a left rear heating element 124, and a right rear heating element 126. It should be apparent to those skilled in the art that top cooking surface 114 may include any suitable number of heating elements, any suitable type of heating elements (i.e., single, double or triple element which operates in different modes) and/or any suitable arrangement of the heating elements.

The exemplary range 110 includes an oven 130 positioned within the cabinet 112 and below cooking surface 114. The oven 130 defines a cooking chamber or cavity 132, which has a maximum setpoint temperature in the normal operating mode. A drop door (not shown) sealingly closes a front opening of the oven during a cooking process. A door latch is configured to lock the door in a closed position during the cooking process and/or during a self-cleaning operation. The cooking cavity 132 is configured to receive and support a food item during the cooking process. The cooking cavity can be provided with at least one heating element 140. For example, the cooking cavity can be provided with an upper heating element, such as a broil heating element, and a lower heating element, such as a bake heating element. The cooking cavity 132 can also be provided with a convection fan 142 operatively associated with the cooking cavity for circulating heated air within the cooking cavity and a light source 146 for illuminating the cooking cavity.

According to one exemplary embodiment, range 110 can include more than one cooking chamber or cavity. For example, the exemplary range 110 can includes a second oven 150 having a second cooking chamber or cavity 152. The second cooking cavity may be configured substantially similar to first cooking cavity 132 or may be configured differently. Additionally, the second cooking cavity 152 may be substantially similar in size to first cooking cavity 132 or may be larger or smaller than first cooking cavity 132. A drop door (not shown) sealingly closes a front opening of the second cooking chamber during the cooking process. Further, the second cooking chamber 152 is equipped with one or more suitable heating elements 156, such as a heating element and a lower heating element, as described above in reference to the cooking cavity 132.

According to another exemplary embodiment, the range 110 can further comprise an RF generation module including a magnetron 160 located on a side or top of the cooking cavity 132. The magnetron can be mounted to a magnetron mount on a surface of the cooking cavity. The magnetron is configured to deliver microwave energy into the cooking cavity 132. A range backsplash (not shown) can extend upward of a rear edge of top cooking surface 114 and can include, for example, a user interface 172, a control display and control selectors for user manipulation for facilitating selecting operative oven features, cooking timers, time and/or temperature displays. An exhaust hood 180 can be provided above the range 110. The exhaust hood can be operatively connected to the controller 102 and can include an exhaust fan 182 and a light source 184 for illuminating the top cooking surface 114.

In the normal operating mode, for use of the oven 130, a user generally inputs a desired temperature and time at which the food item placed in the cooking cavity 132 is to be cooked through at least one input selector. The controller 102 then initiates the cooking cycle. In one exemplary embodiment, the controller 102 is configured to cyclically energize and de-energize the heating element 140 and, if provided, in some cooking cycles, the magnetron 160 to heat the air and radiate energy directly to the food item. The duty cycle for the heating element 140 and magnetron 160, that is, the percent on time for the heating element and magnetron in a control time period, can depend on at least one of a pre-programmed cooking algorithm and a user selected operation mode. The length of time each component is on during a particular control period varies depending on the power level selected. The duty cycle, or ratio of the on time, can be precisely controlled and is pre-determined by the operating parameters selected by the user. Different foods will cook best with different ratios. The oven 130 allows control of these power levels through both pre-programmed cooking algorithms and through user-customizable manual cooking. Energization of the heating element 140 during pre-heat depends on the target temperature corresponding to the cooking temperature selected by a user and the temperature of the cooking cavity 132 upon initiation of the oven 130.

In the normal operating mode, the heating element 140 can have associated with it, a steady state reference temperature. If a target temperature is below the steady state reference temperature, the controller 102 is configured to energize the heating element 140 at 100% duty cycle to the target temperature and then cyclically energize the heating element 140 at the target temperature for the remainder a programmed cooking time.

In order to prevent overheating of the oven 130, the controller 102 can adjusts the power level of the heating element 140 and, if provided, the magnetron 160 to a first power level after a first period of time, and if the first power level is above a threshold power level for the heating element and magnetron, the controller adjusts the first power level to a second lower power level after a second period of time. By way of example, the heating element 140 can be energized to any combination of power levels (e.g., from 0 (not energized) to 10 (energized at 100%)). To prevent overheating, if the heating element 140 is energized at power level ten (10), after a first period of time, for example 10 minutes, the heating element 140 is reduced to 70% of the set power level. If the reduced power level is still higher than the threshold power level, after a second period of time, for example 20 minutes, the heating element 140 is reduced to 50% of the set power level.

Similarly, in using the one of the heating elements 120, 122, 124, 126 of the top cooking surface 114, a user selects the power setting of the heating element, for example, Simmer, Low, Medium and High, through a control selector. Each individual surface heating element has a maximum setting in the normal operating mode. The controller 102 controls the output power of the surface heating element 120, 122, 124, 126 by, for example, duty cycling the heating element at a duty cycle corresponding to the selected power setting, for example Low might be 30% and High might be 100% duty cycle.

If the controller 102 receives and processes an energy signal indicative of a peak demand period at any time during operation of the appliance 100, the controller makes a determination of whether one or more of the power consuming features/functions should be operated in the energy savings mode and if so, it signals the appropriate features/functions of the appliance 100 to begin operating in the energy savings mode in order to reduce the instantaneous amount of energy being consumed by the appliance. The controller 102 determines what features/functions should be operated at a lower consumption level and what that lower consumption level should be, rather than an uncontrolled immediate termination of the operation of specific features/functions.

In order to reduce the peak energy consumed by the cooking appliance 100, the controller 102 is configured to at least one of selectively delay, adjust and disable at least one of the one or more above described power consuming features/functions to reduce power consumption of the cooking appliance 100 in the energy savings mode. Reducing total energy consumed also encompasses reducing the energy consumed at peak times and/or reducing the overall electricity demands. Electricity demands can be defined as average watts over a short period of time, typically 5-60 minutes. Off peak demand periods correspond to periods during which lower cost energy is being supplied by the utility relative to peak demand periods. Operational adjustments that result in functional energy savings will be described in detail hereinafter.

The cooking cavity 132 has a maximum setpoint temperature in the normal operating mode. To reduce the power consumption of the oven 130 in the energy savings mode, the controller 102 is configured to reduce the setpoint temperature in the energy savings mode. To this extent, the power of the heating element 140 of the cooking cavity 132 can be reduced by selectively adjusting the duty cycle of the heating element throughout a selected cooking cycle. The controller can disable or reduce the speed of the convection fan 142 and can disable or reduce the intensity of the light source 146.

If the range 110 includes the magnetron 160, in some instances, the frequency of the energy signal can be impacted by the fundamental frequency of the magnetron 160. A typical microwave oven uses between 500 and 1000 W of microwave energy at 2.45 GHz to heat the food. There may be a high likelihood that the frequency bands of microwave signals generated by the magnetron create interference with frequency bands used for Wibro communication, HSDPA (High Speed Downlink Packet Access), wireless LAN (Local Area Network. IEEE 802.22 standards), Zigbee (IEEE802.15 standards), Bluetooth (IEEE802.15 standards) and RFID (Radio Frequency Identification). If the controller 102 determines that the frequency of the incoming energy signal 106 is generally harmonic with the frequency of the activated magnetron (i.e., the energy signal is impacted or degraded by the magnetron frequency), the controller can at least temporarily block communication with the energy signal to prevent unreliable communications during operation of the magnetron. Alternatively, the controller 102 can temporarily block communication during activation of the magnetron 160 regardless of the frequency if the energy signal 106. The energy signal can be queued in a memory 174. After deactivation of the magnetron, the controller can review and process the queued energy signal stored in the memory to at least partially determine the operating mode for the appliance 100. If the appliance is to operate in the energy savings mode, the power level of the magnetron can be selectively adjusted to reduce the power consumed by the magnetron during subsequent operation.

During the energy savings mode, a pre-heat ramp rate is reduced to reduce demand. The controller 102 can also selectively disable the self clean feature in the energy savings mode. However, if the self clean feature was activated in the normal operating mode and the controller determines based on the cost of supplied energy that the cooking appliance 100 should operate in the energy savings mode, in the illustrative embodiment, the controller 102 will finish the self clean cycle in the energy savings mode. Alternatively, the controller could be configured to immediately interrupt the self-clean mode upon determining the appliance should operate in the energy savings mode and repeat the self-clean cycle after the energy signal signifies an off-peak period or the controller otherwise determines operation in the energy savings mode is no longer desired. As indicated above, the range 110 can include the second oven 150 having the second cooking cavity 152. With this setup, the controller 102 is configured to disable one of the cooking cavities 132, 152, particularly the second cooking cavity, in the energy savings mode.

Regarding the top cooking surface 114, each individual surface heating element 120, 122, 124, 126 has a maximum setpoint temperature in the normal operating mode. To reduce power of the top cooking surface 114, the controller 102 can limit the number of surface heating elements that can be energized and is configured to reduce the setpoint temperature of at least one activated temperature controlled surface heating element in the energy savings mode. The controller can also reduce power of an activated open loop surface heating element by selectively adjusting the duty cycle of the activated heating element. Further, in the energy savings mode, at least one surface heating element 120, 122, 124, 126 can be at least partially disabled.

To further reduce the power consumption of the appliance 100 in the energy savings mode, the controller 102 is configured to disable or reduce the speed of the exhaust fan 182 of the exhaust hood 180. The light source 184 can also be disabled or the intensity of the light source can be reduced.

The determination of which power consuming features/functions are operated in a energy savings mode may depend on whether the appliance 100 is currently operating. In one embodiment, the controller 102 includes functionality to determine whether activation of the energy savings mode for any power consuming features/functions would potentially cause damage to any feature/function of the appliance 100 itself or would cause the appliance to fail to perform its intended function, such as a complete cooking of food in the cooking cavity 132 of the oven 130. If the controller determines that an unacceptable consequence may occur by performing an energy saving action, such as deactivating or curtailing the operation of a power consuming feature/function in the appliance 100, the controller may opt-out of performing that specific energy saving action or may institute or extend other procedures. For example, the controller 102 may determine that the deactivation or limitation of the operation of the convection fan 142 may result in overheating of the heating element 140 which has not yet been deactivated or limited. As a result, the controller prevents the appliance from being damaged.

The controller may also determine whether deactivation or curtailment of a power consuming feature/function would prevent the appliance from performing its desired function. For example, if the controller 102 determines that deactivation or curtailment of the heating element 140 would result in under-cooked food in the oven 130, the controller 102 may opt-out of performing that specific energy savings action or may increase the time that a function is performed, such as a length of cooking.

Figure 3:
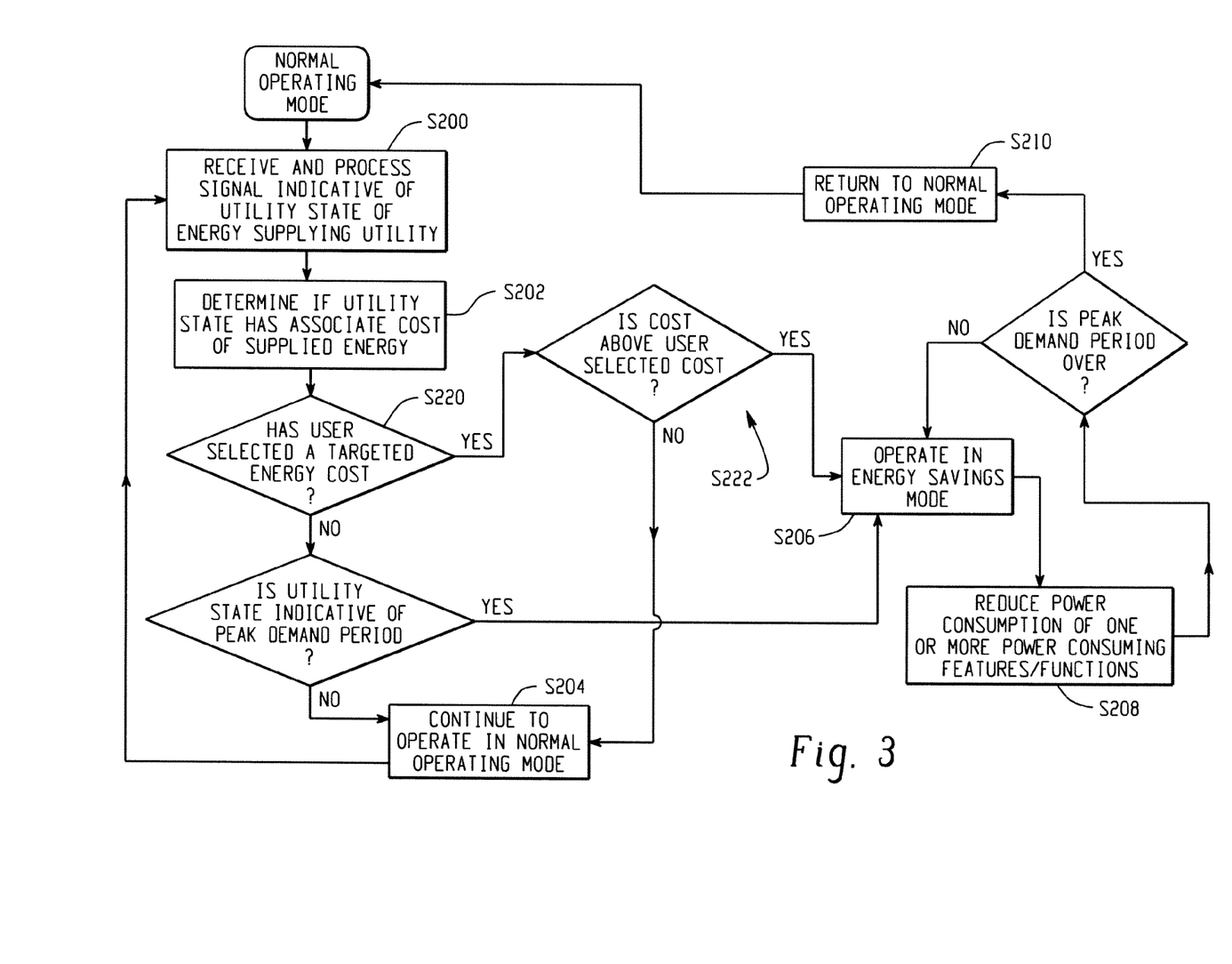
FIGS. 3 and 4 are exemplary operational flow charts for the cooking appliance of FIG. 2.

With reference to FIG. 3, a control method for the surface heating units of the cooking appliance 100 comprises receiving and processing the signal indicative of a state for an associated energy supplying utility, the utility state being indicative of at least a peak demand period or an off-peak demand period, operating the surface heating units of appliance 100 in a normal mode during the off-peak demand period (S204), operating the appliance in an energy savings during the peak demand period (S206) to reduce power consumption of the appliance in the energy savings mode (S208), and returning to the normal mode after the peak demand period is over (S210).

Figure 4:
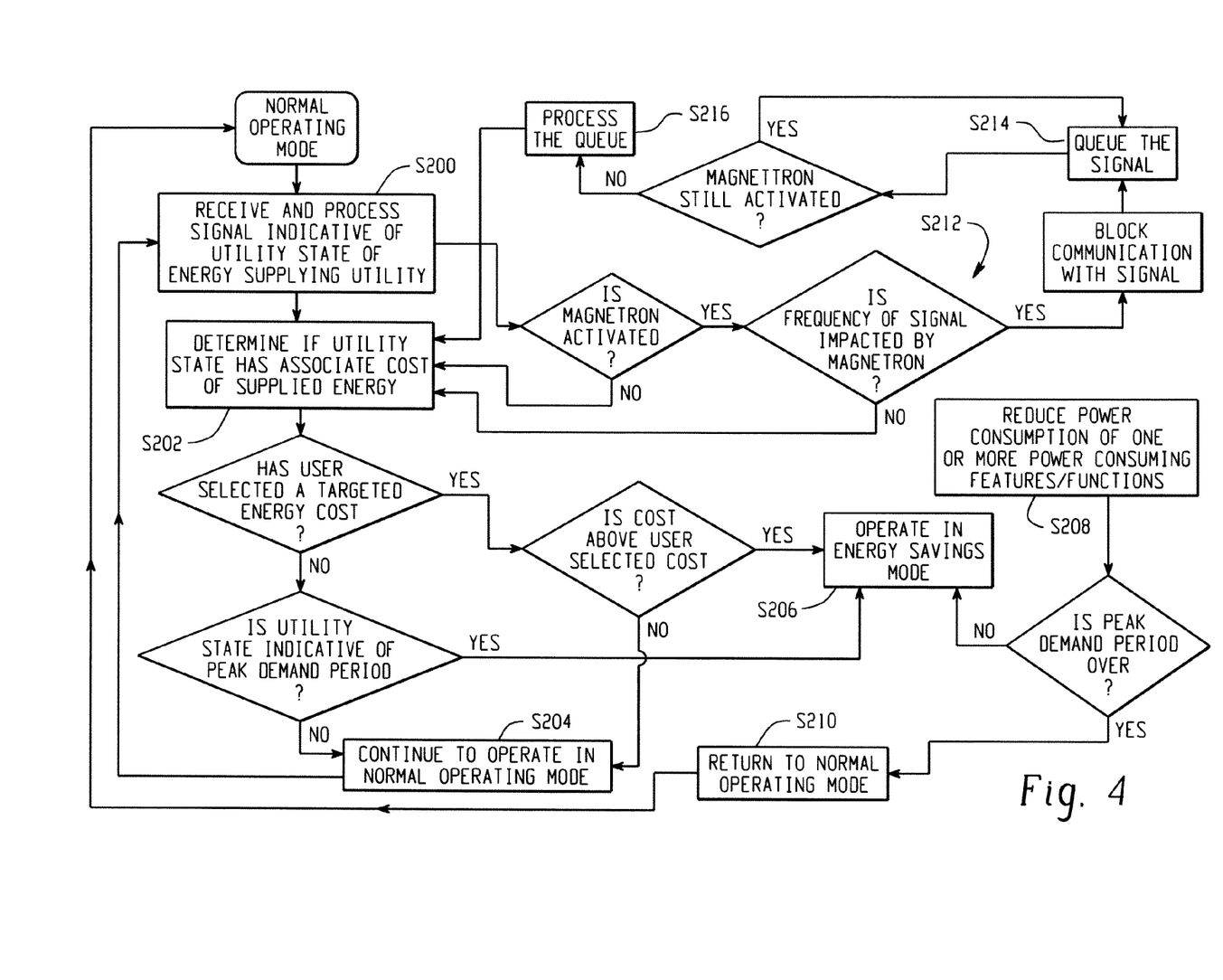

With reference to FIG. 4, if the cooking appliance 100 includes the magnetron 160, the control method can further comprise temporarily blocking the communication with the associated utility during operating of the magnetron 160 if the frequency of the energy signal is impacted by the magnetron to prevent unreliable communications (S212), queuing the communication with the associated utility during operating of the magnetron (S214), and processing the queue after operation of the magnetron for at least partially determining current operating mode for the cooking appliance (S216).

As indicated previously, the control panel or user interface 172 can include a display and control buttons for making various operational selections. The display can be configured to communicate active, real-time feedback to the user on the cost of operating the appliance 100. The costs associated with using the appliance 100 are generally based on the current operating and usage patterns and energy consumption costs, such as the cost per kilowatt hour charged by the corresponding utility. The controller 102 is configured to gather information and data related to current usage patterns and as well as current power costs. This information can be used to determine current energy usage and cost associated with using the appliance 100 in one of the energy savings mode and normal mode. This real-time information (i.e., current usage patterns, current power cost and current energy usage/cost) can be presented to the user via the display.

It is to be appreciated that a manual or selectable override can be provided on the user interface 172 providing a user the ability to select which of the one or more power consuming features/functions are delayed, adjusted and/or disabled by the controller in the energy savings mode. The user can override any adjustments, whether time related or function related, to any of the power consuming functions. Further, the user can override the current operating mode of the appliance 100. Particularly, as shown in FIG. 3, if the utility state has an associated energy cost, the user can base operation of the appliance on a user selected targeted energy cost, such a selected pricing tier or cost per kilowatt hour charged by the corresponding utility (S220). If the current cost exceeds the user selected cost, the controller 102 will operate the appliance 100 in the energy savings mode (S222). If the current cost is less than the user selected cost, the controller 102 will operate the appliance 100 in the normal mode (S222). This operation based on a user selected targeted energy cost is regardless of the current energy cost being indicative of one of a peak demand period and an off-peak demand period.

The operational adjustments, particularly an energy savings operation can be accompanied by a display on the control panel which communicates activation of the energy savings mode. The energy savings mode display can include a display of "ECO", "Eco", "EP", "ER", "CP", "CPP", "DR", or "PP" on the appliance display panel in cases where the display is limited to three characters. In cases with displays having additional characters available, messaging can be enhanced accordingly. Additionally, an audible signal can be provided to alert the user of the appliance operating in the energy savings mode.

The duration of time that the appliance 100 operates in the energy savings mode may be determined by information in the energy signal. For example, the energy signal may inform the appliance 100 to operate in the energy savings mode for a few minutes or for one hour, at which time the appliance returns to normal operation. Alternatively, the energy signal may be continuously transmitted by the utility provider, or other signal generating system, as long as it is determined that instantaneous load reduction is necessary. Once transmission of the signal has ceased, the appliance 100 returns to normal operating mode. In yet another embodiment, an energy signal may be transmitted to the appliance to signal the appliance to operate in the energy savings mode. A normal operation signal may then be later transmitted to the appliance to signal the appliance to return to the normal operating mode.

Figure 5A:
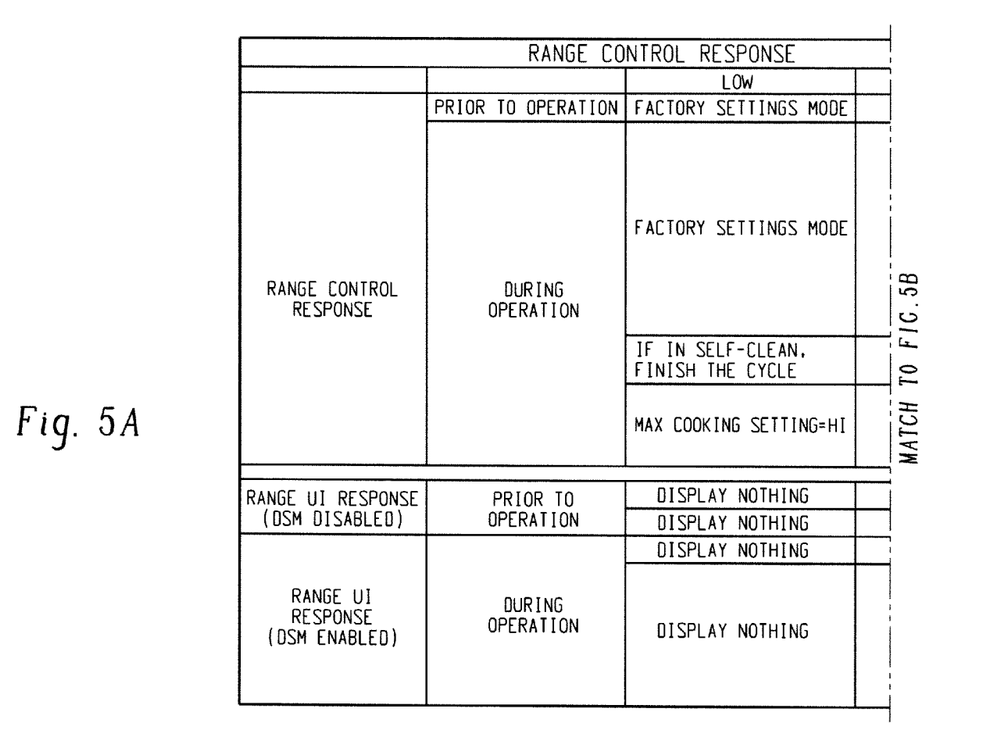
Figure 5B:
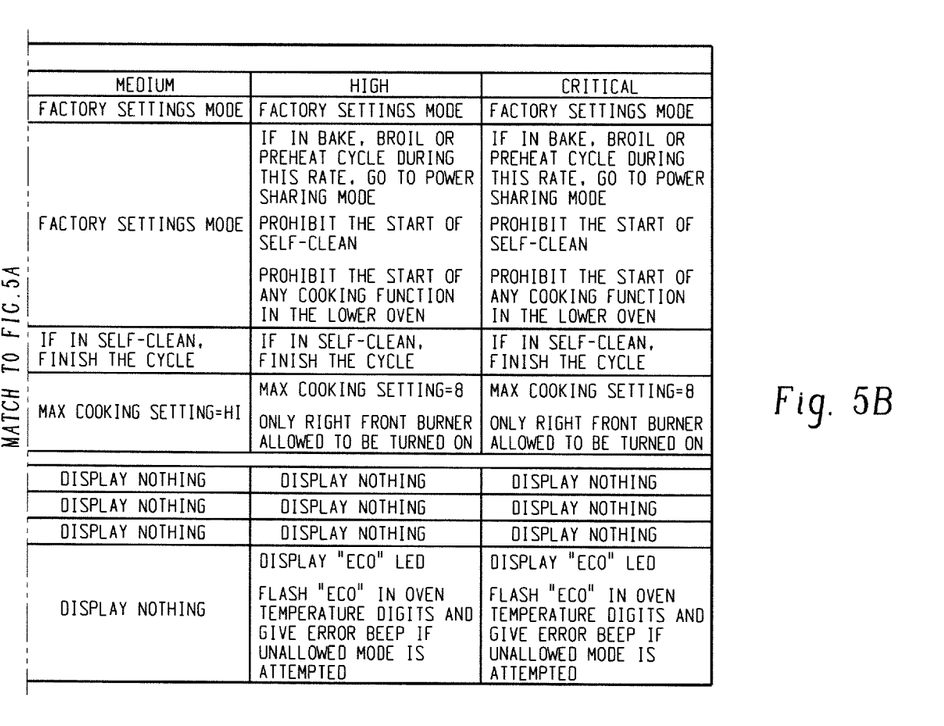

The operation of the appliance 100 may vary as a function of a characteristic of the utility state and/or supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. The controller 102 is configured to operate the appliance in an operating mode corresponding to one of the price tiers. For example, the controller is configured to operate the cooking appliance 100 in the normal operating mode during each of the low and medium price tier and is configured to operate the appliance in the energy savings mode during each of the high and critical price tier. These tiers are shown in the chart of FIG. 5 to partially illustrate operation of the appliance 100 in each pricing tier. In the illustrative embodiment the appliance control response to the LOW and MEDIUM tiers is the same namely the appliance remains in the normal operating mode. Likewise the response to the HIGH and CRITICAL tiers is the same, namely operating the appliance in the energy saving mode. However, it will be appreciated that the controller could be configured to implement a unique operating mode for each tier which provides a desired balance between compromised performance and cost savings/energy savings. If the utility offers more than two rate/cost conditions, different combinations of energy saving control steps may be programmed to provide satisfactory cost savings/performance tradeoff.

In accordance with the present disclosure, FIG. 1 illustrates an energy management system capable of operating household power consuming elements, such as an electromechanically controlled appliance including an oven heater, in an energy saving mode to reduce peak power. Electromechanical control of the oven heaters of the illustrative embodiment is provided by an oven thermostat rather than electronic oven controls. At least one of the oven heaters of the electromechanically controlled cooking appliance includes at least two heater elements, at least one of which is selectively switchable in response to the utility state signal.

Figure 6:
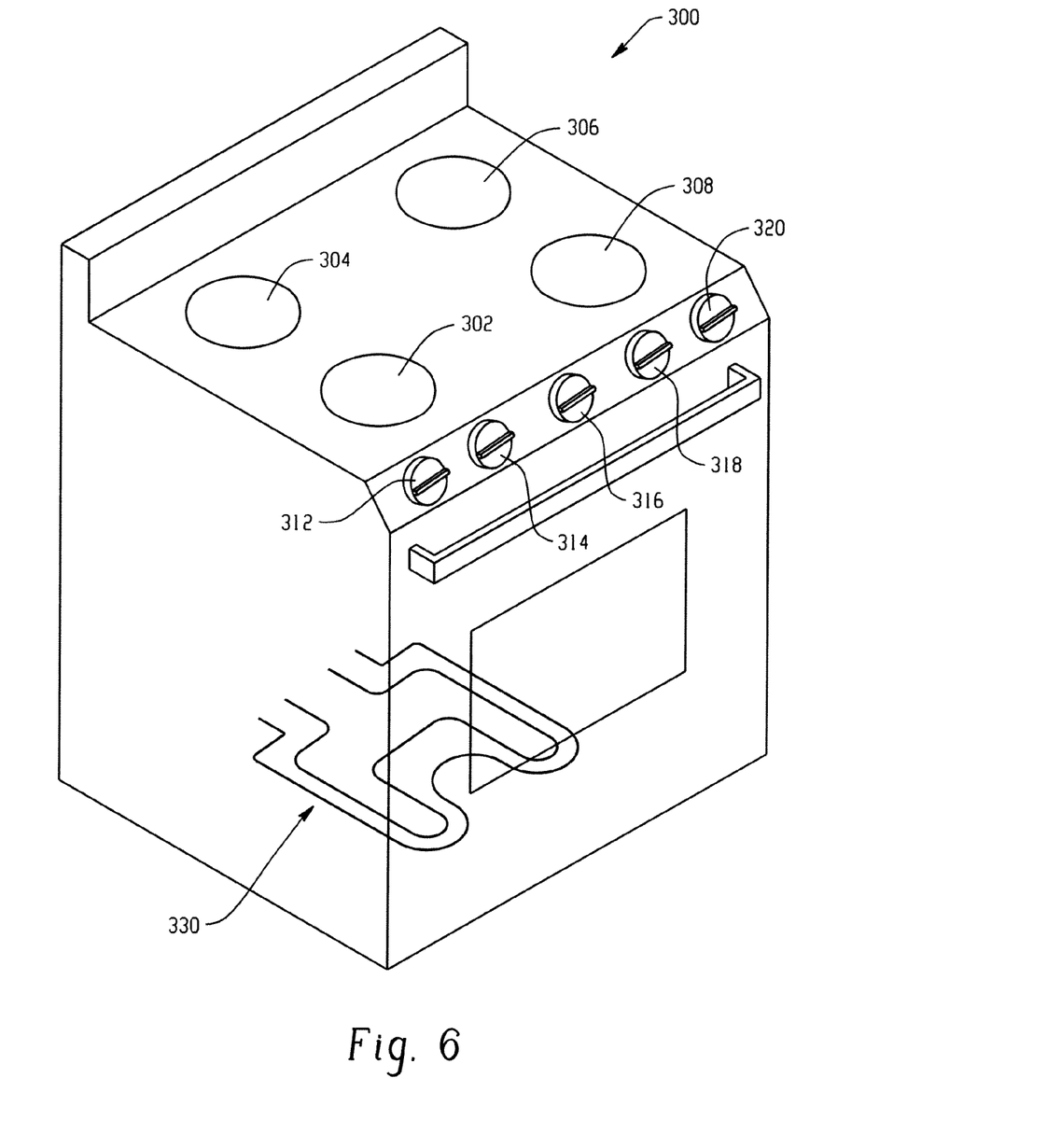
FIG. 6 is an exemplary embodiment of a cooking appliance with an electromechanically controlled oven heater adapted for operation in an energy management system of the type illustrated in FIG. 1.

A range 300 illustratively embodying such a control arrangement is schematically illustrated in FIG. 6. Range 300 has four surface heating units 302, 304, 306 and 308, each having an associated infinite heat switch mechanically linked to control knobs 312, 314, 316, and 318 respectively. The user selects the power setting for each surface heating unit, by manually adjusting the control knobs to the desired setting, in conventional fashion. Range 300 further includes an oven cavity with an oven heater 330 disposed proximate the bottom of the oven cavity conventionally provided within the range body for heating the cavity. An electromechanical thermostat switch for controlling energization of the oven heater is mechanically linked to oven control knob 320. Range 300 further includes a relatively simple electronic control (not shown in FIG. 6), which is configured to receive utility state signals from a DSM or directly from a smart utility meter when for example, range 300 is deployed in an energy management system of the type described above with reference to FIG. 1, and to provide control signals for the electromechanical control to enable operation in an energy savings mode as hereinafter described.

Figure 7:
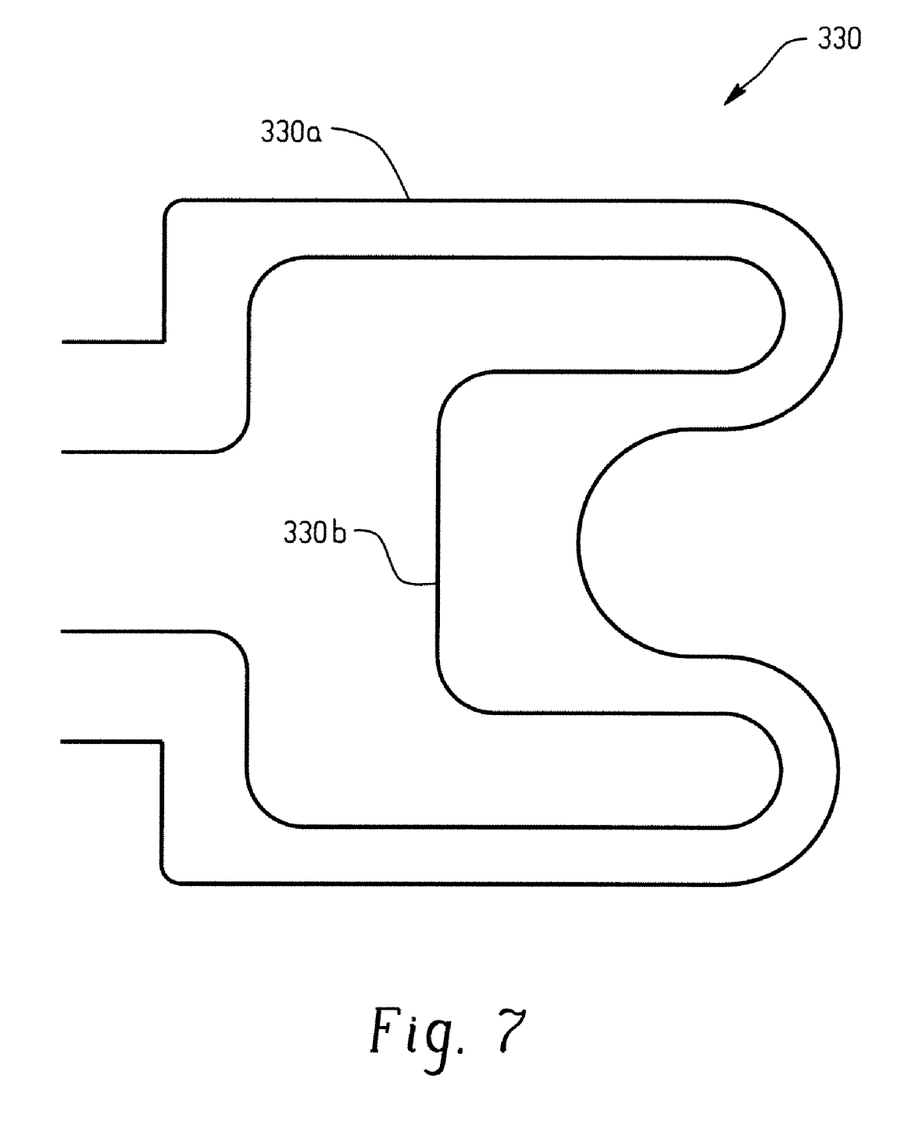
FIG. 7 is a schematic diagram of the physical configuration of the bake heater in the power control system for the oven heater of the cooking appliance of FIG. 6.
Figure 8:
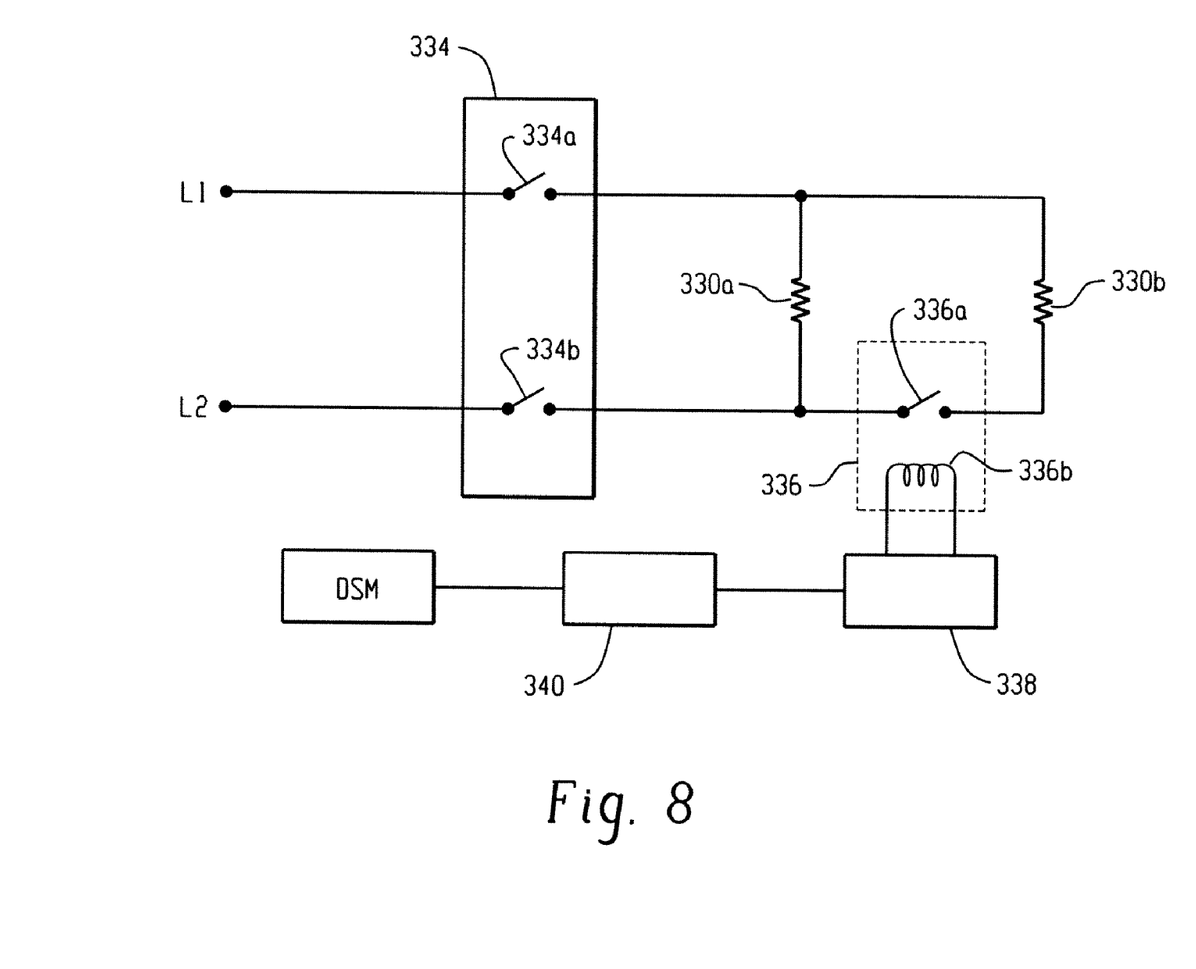
FIG. 8 is a simplified schematic circuit diagram of the power control system for the oven heater of the appliance of FIG. 6.

As best seen in FIGS. 7 and 8, oven heater 330 comprises two resistive heating elements 330a and 330b. First heating element 330a which in this embodiment is a 550 watt resistive element, is connected in parallel with second heating element 330b, a 2300 watt resistive element, across a standard 240 volt ac power supply represented by L1 and L2 via a conventional thermostat switch 334 which comprises on/off switch 334a and cycling switch 334b and a temperature sensor, not shown positioned in the oven to sense the ambient temperature in the oven cavity. Switch 334a is closed by the movement of oven control knob 320 from its Off position toward its bake temperature selection positions and opened by returning of the knob to its Off position. Alternatively, the on/off switch contacts 334a could opened and closed by a separate user actuable button or switch control. The user selects the desired bake temperature of the oven by rotation of the control knob 320 to the position associated with the desired temperature in conventional fashion. Switch 334b cycles on when the thermostat senses a temperature in the oven that is less than the setpoint temperature selected by the user and opens when the temperature sensed exceeds the selected setpoint temperature.

In accordance with the present disclosure, a normally closed relay 336 includes normally closed switch contacts 336a connected in series with the second heating element 332b to allow selective disabling of element 332b during operation in the energy saving mode. Relay coil 336b which controls the state of switch contacts 336a is connected in a conventional relay driver circuit 338 which is electrically coupled to electronic control device 340. During operation in the normal operating mode, relay switch 336a is closed and the cycling of both heating elements 330a and 330b are controlled by the thermostat switch 334 in a conventional manner. In response to a utility state signal indicative of a peak demand period, control 340 initiates operation in the energy saving mode, by generating a switching signal which energizes relay coil 336b causing relay switch 336a to open disabling energization of heating element 330a. Thermostat switch 334b will continue to thermostatically control energization of heating element 330b. Control 340 will sustain the switching signal for the duration of the peak demand period. On receipt of a utility signal signifying an off-peak demand period, control 340 will de-energize coil 336b and switch 336a will return to its normally closed state. By this arrangement when operating in the energy saving mode, disabling of the second element 330b results in approximately 20% reduction in peak energy consumption relative to operation in the normal mode. While in the illustrative embodiment an electromechanical relay 336 is employed, it is to be understood that, solid state switching devices can be similarly employed.

The heater elements 330a and 330b are preferably distributed over the typical heating area of a conventional bake heater and configured in a planar pattern proximate the lower region of the oven cavity. As such, if only one element is energized, it would not substantially adversely affect the heat distribution in the oven. An illustrative embodiment of the physical configuration of oven heater 330 is shown in FIG. 7.

While the illustrative embodiment employs an electromechanical thermostat switching device as the user adjustable controller for controlling energization of the oven heater, the arrangement of the subject disclosure could be employed in a cooking appliance with an electronic oven control as the user adjustable controller in similar fashion in order to provide for operation in an energy saving mode without need to make any changes to the oven control algorithms. In such an embodiment, the thermostat switch 334 of FIG. 8 would simply be replaced by an electronically controlled switch responsive to the electronic oven control. The arrangement and operation of control 340 and relay 336 need not differ from that described for the embodiment of FIG. 8. Alternatively, control 340 could be incorporated into the electronic oven control such that the switching signal to relay driver 338 and switching signals for the switch that is substituted for thermostat 334 would be provided by the electronic oven control.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for reducing peak power usage in a cooking appliance having an oven cavity therein, said system comprising:

at least one power consuming unit comprising at least two separately controllable elements;

a user adjustable controller for controlling energization of said at least one power consuming unit;

a control configured to operate the cooking appliance based on a user selected targeted energy cost and to receive and process a utility state signal having an associated energy cost indicative of the current state of an associated utility; and an element switching device responsive to said control and configured to selectively enable and disable energization of one of said elements in response to the utility state signal, wherein if current energy cost exceeds the user selected targeted energy cost, the control operates the appliance in the energy savings mode, and wherein if the current energy cost is less than the user selected targeted energy cost, the control operates the appliance in the normal operating mode.

2. The system according to claim 1, wherein said system further includes a relay coil operationally coupled to said control, wherein said control is configured to energize said relay coil, causing said element switching device to open and disable energization of one of said elements in response to a utility state signal indicative of a peak demand period.

3. The system according to claim 1, wherein said at least one power consuming unit comprises an oven heater.

4. The system according to claim 1, wherein said user adjustable controller comprises a thermostat.

5. The system according to claim 1, wherein said at least two elements are configured in a planar pattern proximate the lower region of the oven cavity, such that disabling energization of one of said elements does not significantly adversely affect heat distribution in the oven cavity.

6. The system according to claim 1, where upon receiving a utility state signal indicative of a peak demand period, said control operates the system in an energy saving mode, and upon receiving a utility state signal indicative of an off-peak demand period, said control operates the system in a normal operating mode.

7. The system according to claim 1, wherein said element switching device is an electromechanical relay switch.

8. An electromechanically controlled cooking appliance comprising:

an oven cavity having an oven heater disposed therein, said oven heater comprising at least a first and a second separately controllable heating elements;

an electromechanical switching device capable of controlling energization to said oven heater;

an electronic control device configured to operate the cooking appliance based on a user selected targeted energy cost and to receive utility state signals having associated energy costs from one of a DSM and a utility meter; and an electromechanical relay switch electronically coupled to said control, wherein upon receiving a signal indicating a peak demand period and if current energy cost exceeds the user selected targeted energy cost, said control operates the appliance in energy saving mode, and upon receiving a signal indicating a off-peak demand period and if the current energy cost is less than the user selected targeted energy cost, said control operates the appliance in normal mode.

9. The cooking appliance according to claim 8, wherein said electromechanical relay switch is in a closed position when said control is operating the appliance in normal mode.

10. The cooking appliance according to claim 8, wherein said electromechanical relay switch is configured to selectively disable said second heating element during operation in energy saving mode.

11. The cooking appliance according to claim 10, wherein said first heating element is configured to remain thermostatically controlled by the switching device during energy saving mode.

12. The cooking appliance according to claim 10, wherein upon receiving utility signal indicating an off-peak demand period, said control will return the relay switch to its normally closed state.

13. The cooking appliance according to claim 10, wherein operating in said energy saving mode results in approximately 20% reduction in peak energy consumption relative to operation in normal mode.

14. A method for reducing peak power usage in a cooking appliance having an oven cavity therein, said method comprising:

providing said oven cavity with an oven heater comprising at least two separately controllable elements;

operationally coupling a control to an electromechanical relay switch, said control configured to operate the cooking appliance based on a user selected targeted energy cost and to receive and process a utility state signal having an associated energy cost indicative of the current state of an associated utility;

operating said appliance in an energy saving mode upon receiving a signal into said controller indicative of a peak demand period if current energy cost exceeds the user selected targeted energy cost; and operating said appliance in a normal mode upon receiving a signal into said controller indicative of an off-peak demand period if the current energy cost is less than the user selected targeted energy cost.

15. The method according to claim 14, wherein operating said appliance in energy saving mode includes selectively disabling one of said two elements.

16. The method according to claim 15, wherein disabling one of said two elements includes causing said relay switch to open by energizing an associated relay coil in response to a signal indicative of a peak demand period.

17. The method according to claim 16, further including causing said relay switch to close by de-energizing said relay coil in response to a signal indicative of an off-peak demand period.

18. The method according to claim 14, wherein said at least two separately controllable elements are distributed in a planar pattern proximate to the lower heating area of said oven cavity.

19. The method according to claim 14, wherein operating said appliance in energy saving mode reduces peak energy consumption by approximately 20% relative to operation in normal mode.

* * * * *